United States Patent
de Jong et al.

(10) Patent No.: US 12,032,582 B2
(45) Date of Patent: Jul. 9, 2024

(54) BI-GRAM CARDINALITY ESTIMATION IN A GRAPH DATABASE

(71) Applicant: Neo4j Sweden AB, San Mateo, CA (US)

(72) Inventors: Niels de Jong, Eindhoven (NL); James Webber, Guildford (GB)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 18/221,764

(22) Filed: Jul. 13, 2023

(65) Prior Publication Data
US 2024/0012824 A1 Jan. 11, 2024

Related U.S. Application Data

(63) Continuation of application No. 18/073,292, filed on Dec. 1, 2022, now Pat. No. 11,748,362, which is a continuation of application No. 16/719,594, filed on Dec. 18, 2019, now Pat. No. 11,544,280.

(51) Int. Cl.
| | |
|---|---|
| *G06F 16/2458* | (2019.01) |
| *G06F 16/2453* | (2019.01) |
| *G06F 16/248* | (2019.01) |
| *G06F 16/28* | (2019.01) |

(52) U.S. Cl.
CPC .... *G06F 16/2458* (2019.01); *G06F 16/24549* (2019.01); *G06F 16/248* (2019.01); *G06F 16/284* (2019.01)

(58) Field of Classification Search
CPC .. G06F 16/2453; G06F 16/248; G06F 16/284; G06F 16/28; G06F 16/2458; G06F 16/24549
See application file for complete search history.

(56) References Cited

U.S. PATENT DOCUMENTS

| | | | |
|---|---|---|---|
| 6,105,020 | A | 8/2000 | Lindsay |
| 10,402,419 | B1 | 9/2019 | Rubinstein |
| 2016/0283551 | A1 | 9/2016 | Fokoue-Nkoutche |
| 2017/0139991 | A1 | 5/2017 | Teletia |
| 2017/0308620 | A1* | 10/2017 | Cao .......... G06F 16/13 |

(Continued)

OTHER PUBLICATIONS

Yakovets et al. Waveguide: Evaluating SPARQL Property Path Queries. Published in Proc. 18th International Conference on Extending Database Technology (EDBT), Mar. 23-27, 2015. Brussels, Belgium: ISBN 978-3-89318-067-7.

*Primary Examiner* — Etienne P Leroux
(74) *Attorney, Agent, or Firm* — Van Pelt, Yi & James LLP (57) ABSTRACT

A method and apparatus for estimating the cardinality of graph pattern queries using graph statistics and metadata is presented. In various embodiments, node and edge labels are used to compute estimates for graph patterns (bi-grams) and the estimates for these patterns as composed to provide cardinality estimates of longer paths. The computation of bi-grams is low cost and requires only minimal changes to the existing query planner in the existing database machinery to be useful. The resulting estimates are used during query execution to minimize the amount of work needed to complete a query and return a faithful and accurate answer to the user. The apparatus includes modules containing computer-executable instructions to perform the above method.

22 Claims, 5 Drawing Sheets

(56) References Cited

U.S. PATENT DOCUMENTS

| | | |
|---|---|---|
| 2018/0096015 A1* | 4/2018 | Sarkar ................. G06F 16/9024 |
| 2018/0150551 A1 | 5/2018 | Wang |
| 2019/0295078 A1 | 9/2019 | Bae |
| 2019/0370257 A1 | 12/2019 | Wolf |
| 2020/0110827 A1 | 4/2020 | Freedman |
| 2020/0265049 A1 | 8/2020 | Da Trindade et al. |
| 2020/0285643 A1 | 9/2020 | Kadiam |

* cited by examiner

BI-GRAM CARDINALITY ESTIMATION IN A GRAPH DATABASE

CROSS REFERENCE TO OTHER APPLICATIONS

This application is a continuation of U.S. patent application Ser. No. 18/073,292 entitled BI-GRAM CARDINALITY ESTIMATION IN A GRAPH DATABASE filed Dec. 1, 2022, which is a continuation of U.S. patent application Ser. No. 16/719,594 entitled BI-GRAM CARDINALITY ESTIMATION IN A GRAPH DATABASE filed Dec. 18, 2019, both of which are incorporated herein by reference for all purposes.

BACKGROUND OF THE INVENTION

A graph database uses data structures with nodes, edges, labels, and properties to represent data. A node may represent an entity such as a person, a business, an organization, or an account. Each node has zero or more labels that represent its role in the graph, for example as a customer or a product. Nodes have zero or more properties which contain data for that node. For example, if a node represents a person, the properties associated with that node may be the person's gender, age, and/or identification number of some kind. Edges connect the nodes in a way that is meaningful for the domain. They are directed, have a type which indicates their purpose and may also have associated property data (such as weightings).

Graph databases have numerous applications. For example, a graph database may be used in healthcare management, retail recommendations, transport, power grids, integrated circuit design, fraud prevention, and a social network system, to name a few.

Prior graph database methods for planning the efficient execution of queries stem from relational database technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to estimate cardinality of paths between two nodes in a graph stored in a graph database, e.g., as part of query planning. There may be many paths between any given nodes in the database and some paths will be more expensive to process than others but achieve the same goal. In various embodiments, a query planner as disclosed herein chooses the least expensive query plan for execution at the time of planning such that the database provides higher throughput and lower latency.

In various embodiments, a query planner as disclosed herein determines an optimal query plan based at least in part on input received from a cardinality estimator configured to estimate the number of occurrences of certain entities, such as nodes, relationships, etc. of a given type (label), that are present in a graph database and/or result set associated with a query.

In various embodiments, techniques disclosed herein are used to capture and store statistics (counts) of the occurrence of one or more bi-grams in a graph database. In various embodiments, the term "bi-gram" refers to a path pattern that includes a node having a first relationship with a first node and a second relationship with a second node. In various embodiments, a cardinality estimator as disclosed herein uses the statistics to estimate the cardinality of one or more bi-grams in a result set, being the data returned in response to a database query. The term "cardinality" refers generally to the number of elements in a set, and in various embodiments when applied to a given bi-gram may refer to the (estimated) number of instances or occurrences of the bi-gram, e.g., in a result set. In various embodiments, a query planner uses a cardinality estimate based at least in part on bi-gram statistics as disclosed herein to determine an optimal query plan for a query.

Query planning is a difficult task. For example, it may be more expensive to process a short path through a densely connected part of the graph than a much longer path which traverses a sparsely connected part of the graph.

Typically, it is prohibitively expensive to process the whole graph in order to plan query execution perfectly. Furthermore, the results of whole-graph computation become stale quickly as the graph mutates as the database processes updates.

In various embodiments, graph metadata and statistics such as degree, span, and so on are used to avoid large computational costs while making reasonably accurate estimates of the cardinality of path patterns in the graph to provide good query plans. The properties of the graph, such as average degree for a node label, which are stored alongside the graph in the database, are used in various embodiments to estimate cardinality. Such graph metadata is made accessible to the database's query planner and used to create better query plans, in turn leading to improved query execution time while maintaining correctness.

When a client sends a query to a database, that query's intent is first analyzed and understood. Subsequently a module/entity in the database known as a planner determines how the query will be executed so as to minimize latency and resource consumption.

Typically, database management systems use cost-based planners where an abstract cost is associated with each plan, and the goal of the planner is to compute the cheapest cost from multiple possible query execution plans. To obtain the cost for a query, the planner estimates the amount of data that will need to be processed in order to return the correct result to the client.

A good planner minimizes the amount of work that the database needs to undertake during query execution but should not itself incur a large computational or latency penalty. These are difficult opposing tensions to resolve for which techniques disclosed herein provide a practical solution.

In various embodiments, a query planner component of a graph database management system as disclosed herein implements an algorithm which estimates the cardinalities for paths in a graph database using statistics (graph metadata). The query planner utilizes the cardinality estimator as part of the overall planning process, mixing in cardinality estimates for paths with other metadata like the cost of executing an operator. Taken together, the function is to determine how to execute a query from a user most effectively (lowest computational cost) given the current state of the underlying graph data.

In this description, some specific syntax is used to convey important aspects. These are as follows:

a. Path patterns—(:A)-[:X]→(:B)←-[:Y]-(:C). Matches against nodes and relationships in a graph database where there exists a node labelled B which has incoming an incoming X relationship from a node labelled A, and an incoming Y relationship from a node labelled C. A node without labels is represented as ( . . . ) and can appear in path patterns in place of labelled nodes. In some embodiments, relationships are always named.

b. Cardinality—#(:A)-[:X]→(:B)←-[:Y]-(:C). Where the if function yields the cardinality (e.g., number of returned rows) of the path expression.

In various embodiments techniques disclosed herein extend the query planning machinery and/or component present in a graph database management system, such as the Neo4j™ graph database.

Figure 1:
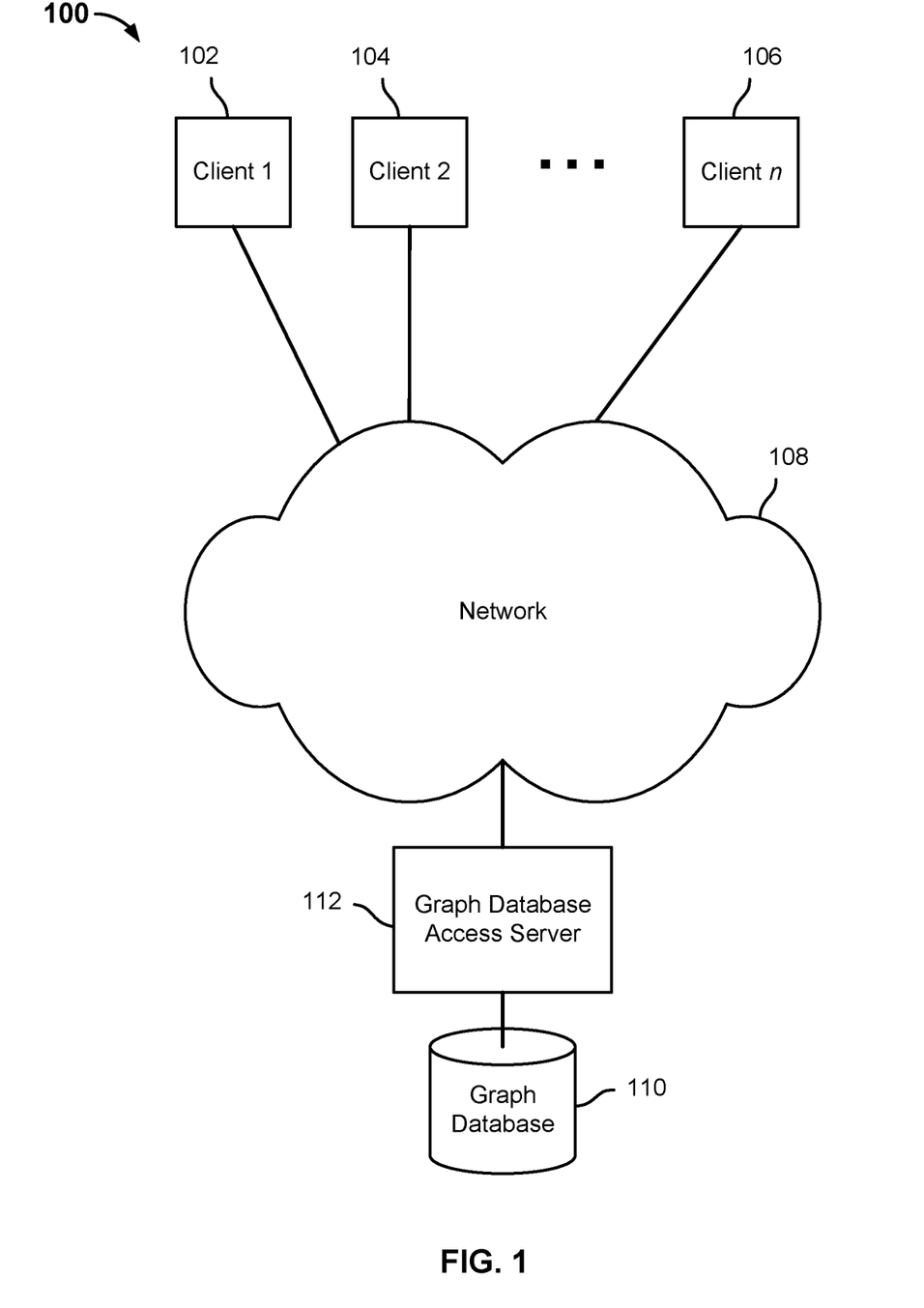
FIG. 1 is a block diagram illustrating an embodiment of a graph database system and environment.

FIG. 1 is a block diagram illustrating an embodiment of a graph database system and environment. In the example shown, graph database system and environment 100 includes a plurality of clients 1 to n, represented in FIG. 1 by clients 102, 104, and 106, each of which is connected via network 108 (e.g., the Internet) to a graph database access server (and/or service or system) 112. Graph database access server 112 is configured to provide access to graph database 110, e.g., by processor queries received from clients 102, 104, and/or 106 and returning results responsive to such queries.

In various embodiments, graph database access server 112 and/or graph database 110 comprise a computerized record management system that uses a network structure with nodes, edges, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Figure 2:
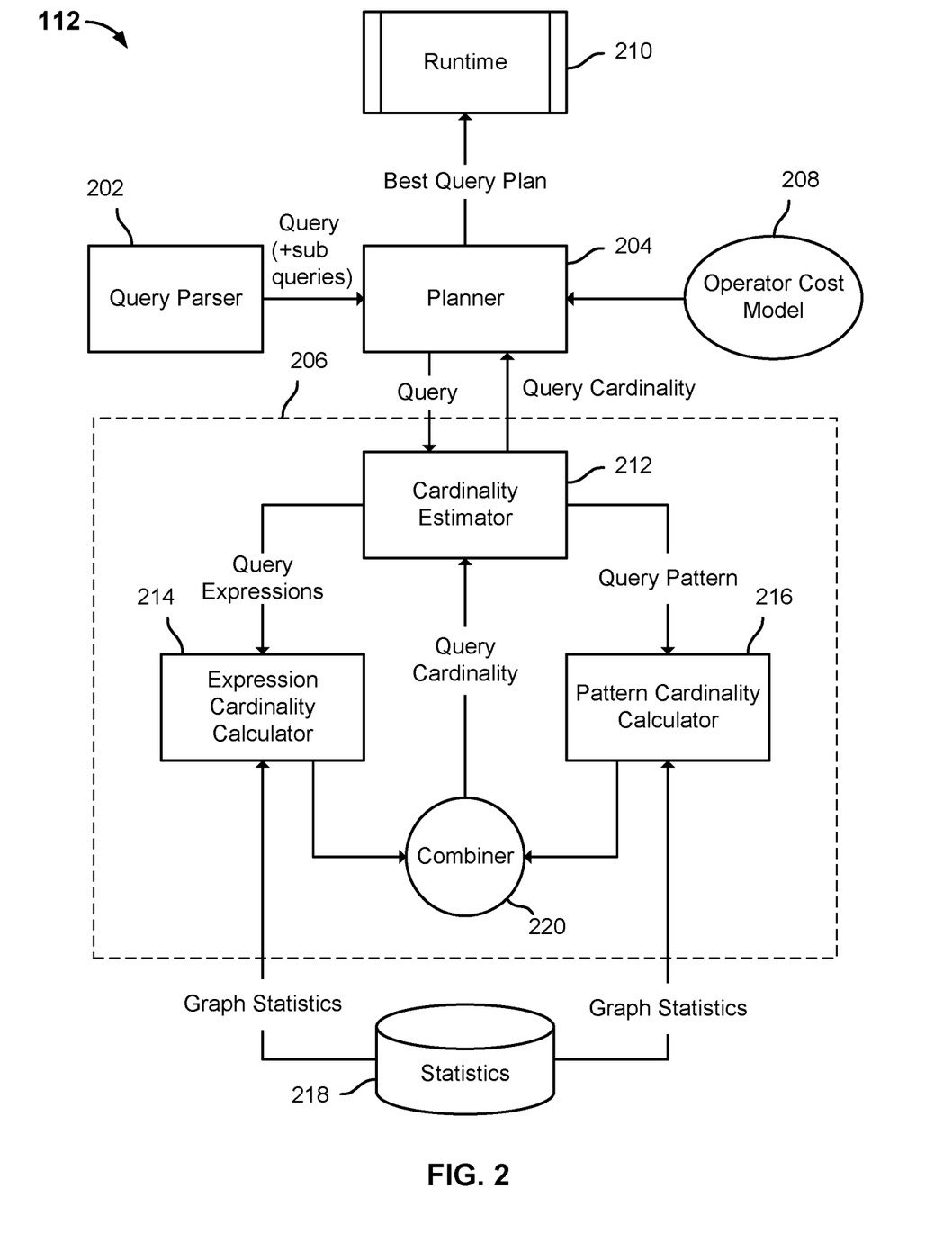
FIG. 2 is a block diagram illustrating an embodiment of a graph database access system, service, and/or server.

FIG. 2 is a block diagram illustrating an embodiment of a graph database access system, service, and/or server. In the example shown, graph database access server 112 include a query parser 202 configured to receive a query via a communication interface, e.g., from a client such as client 102, 104, or 106 of FIG. 1, and transform the query into an internal representation of the query. The query parser 202 provides the parsed query to query planner module 204. Query planner module 204 obtains an estimated cardinality from a cardinality estimation subsystem 206 and an operator cost model 208 to determine a best query plan to execute the query, e.g., a query plan determined within a prescribed time to be a lowest cost plan to execute the query. The determined best query plan is provided to a runtime 210 configured to execute the plan, e.g., by performing operations with respect to the graph database 110.

In the example shown in FIG. 2, graph database access system/server 112 includes:

a. Query parser 202: Accepts the client's query as input and turns its textual query representation into a logical representation suitable for planning and optimization.

b. Runtime 210: Executes the query against the underlying database (e.g., graph database 110) once planning has completed.

c. Planner 204: Responsible for the computation of query plans and for selecting the likely best query plan from the possible search space given the prevailing workload and content in the database. It uses an estimator for such computations.

d. Statistics 218: A store of graph metadata which is kept strictly up to date with the underlying graph. In various embodiments, statistics maintained include one or more of the following:
   i. Total node count;
   ii. Total relationship count;
   iii. Number of nodes for each label;
   iv. Number of relationships for each relationship type;
   v. Number of nodes for each label for each outgoing relationship type;
   vi. Number of nodes for each label for each incoming relationship type;
   vii. Number of nodes for each label which have an outgoing relationship of any type;
   viii. Number of nodes for each label which have an incoming relationship of any type; and
   ix. Bi-gram counts as described and disclosed herein.

Referring further to FIG. 2, in the example shown cardinality estimation subsystem 206 includes a cardinality estimator module 212, e.g., a software module running on a processor. Cardinality estimator module 212 is configured to receive a query (with optional sub-queries) from planner 204, and to send query patterns to a pattern cardinality calculator 216 configured to calculate pattern cardinality based on graph statistics 218. The cardinality estimator module 212 is further configured to send query expressions to an expression cardinality calculator 214 configured to calculate expression cardinality based on graph statistics 218. A combiner 220 computes a combined cardinality based on the cardinalities calculated by pattern cardinality calculator 216 and expression cardinality calculator 214 to provide a combined query cardinality to cardinality estimator module 212. The cardinality estimator module 212 uses the combined cardinalities of a query and its sub-queries to determine an estimated result cardinality, which is provided to the planner 204.

In various embodiments, graph statistics 218 include bi-gram counts as disclosed herein. Pattern cardinality calculator 216 uses the bi-gram counts, in various embodiments, to estimate the cardinality of bi-grams associated with the query. The bi-gram cardinality(ies) is/are used to determine, at least in part, the query cardinality provided to and used by the cardinality estimator to determine the estimated result cardinality provided to the planner. In various embodiments, use of bi-gram statistics as disclosed herein yields more accurate cardinality estimates, which enable more optimal (lower cost) query plans to be determined.

Figure 3:
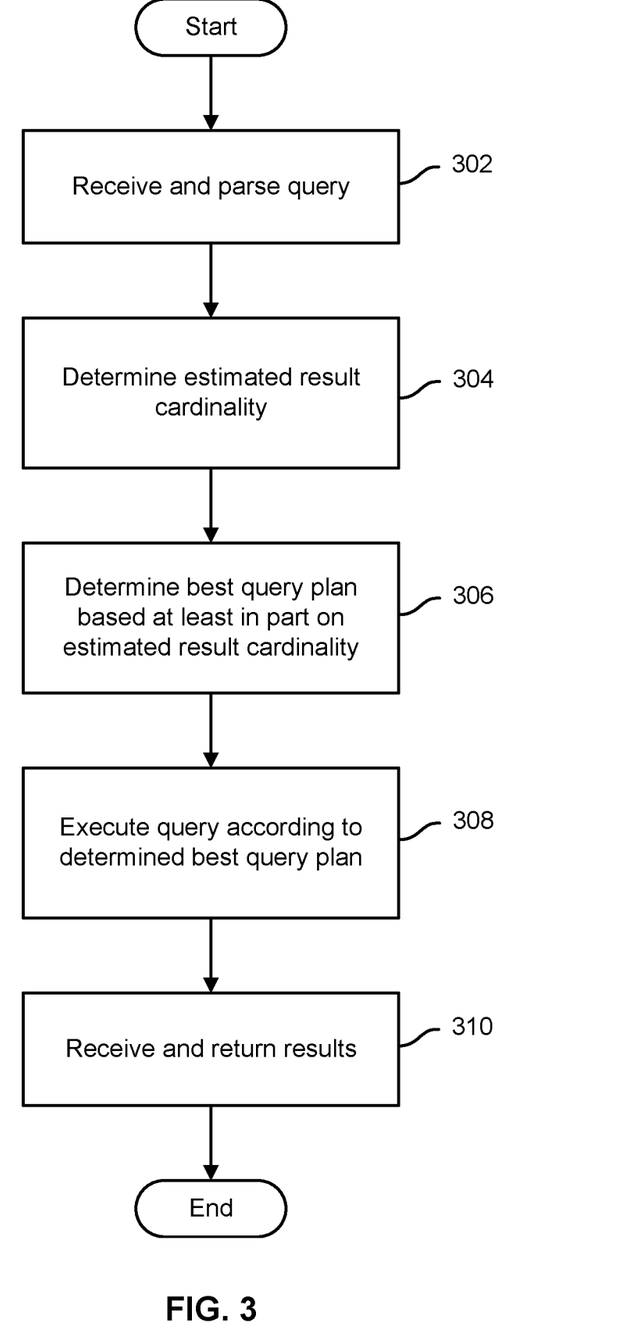
FIG. 3 is a flow diagram illustrating an embodiment of a process to process and respond to a graph database query.

FIG. 3 is a flow diagram illustrating an embodiment of a process to process and respond to a graph database query. In various embodiments, the process of FIG. 3 is performed by a graph database management system, such as system and environment 100 of FIG. 1 and/or graph database access server 112 of FIGS. 1 and 2. In the example shown, a query is received and parsed at 302. For example, a query expressed in a graph database query language, such as Cypher, is received and parsed. An estimated result cardinality is determined at 304. At 306, a best query plan is determined based at least in part on the parsed query and the estimated result cardinality. At 308, the query is executed (e.g., by a runtime such as runtime 210 of FIG. 2) according to the determined best query plan. At 310, query results are received and returned, e.g., to a client from which the query was received.

As noted, in various embodiments, instead of dealing solely with simple atomized statistics (e.g. single relationships with their incident nodes), a system as disclosed herein deals (also) with bi-grams: a sequence of two relationship types occurring in order.

Figure 4A:
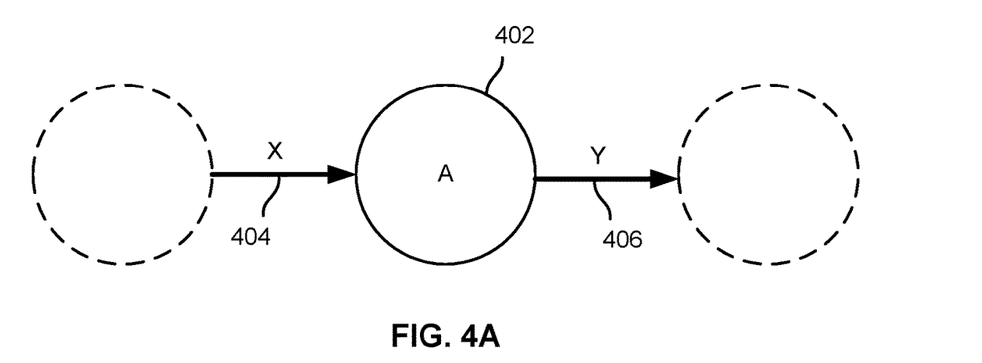
FIG. 4A illustrates an example of a generalized bi-gram having a common node 402 labeled "A", and incoming relationship 404 of type "X", and an outgoing relationship 406 of type "Y".
Figure 4B:
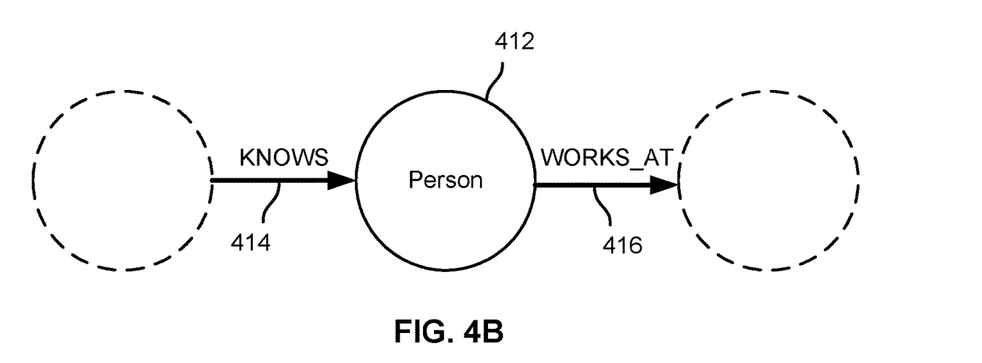
FIG. 4B illustrates a more specific example of a bi-gram, in this example a bi-gram having a common node 412 labeled "Person", an incoming relationship 414 of type "KNOWS", and an outgoing relationship 416 of type "WORKS_AT".
Figure 4C:
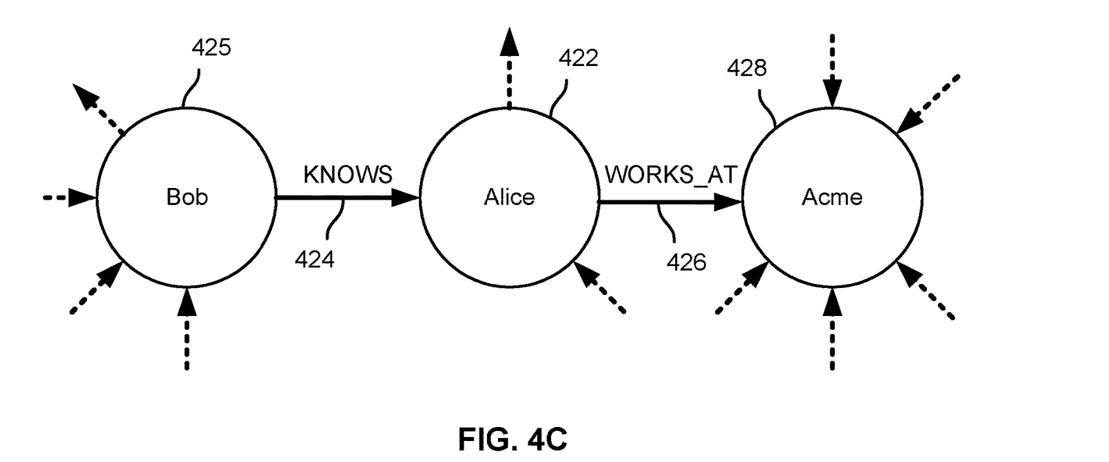
FIG. 4C shows an instance of a bi-gram of the general type shown in FIG. 4A and the more specific type shown in FIG. 4B.

FIGS. 4A-4C illustrate examples of a bi-gram. FIG. 4A illustrates an example of a generalized bi-gram having a common node 402 labeled "A", and incoming relationship 404 of type "X", and an outgoing relationship 406 of type "Y". FIG. 4B illustrates a more specific example of a bi-gram, in this example a bi-gram having a common node 412 labeled "Person", an incoming relationship 414 of type "KNOWS", and an outgoing relationship 416 of type "WORKS_AT". FIG. 4C shows an instance of a bi-gram of the general type shown in FIG. 4A and the more specific type shown in FIG. 4B. Specifically, FIG. 4C shows a bi-gram instance with a common "Person" node 422 with name attribute "Alice"; incoming relationship of type "KNOWS" from "Person" node 425 with name attribute "Bob" (i.e., "Bob KNOWS Alice"); and an outgoing relationship 426 of type "WORKS_AT" with a "Company" node 428 with name attribute "Acme" (i.e., Bob KNOWS Alice who WORKS_AT at a Company named "Acme").

In various embodiments, counts of bi-grams, such as those illustrated by the examples shown in FIG. 4A-4C, are generated and maintained, and such bi-gram statistics are used to generate cardinality estimates used in query planning, to generate more highly optimized query plans as disclosed herein.

In order to support bi-gram estimation, in various embodiments the design of the graph database system includes additional components.

For example, in some embodiments, three new metadata stores are added into the statistics database:
   a. TWO_GRAM_INCOMING_OUTGOING_COUNT (X, A, Y)
      Stores the count of the pattern ( . . . )-[:X]→(:A)-[:Y]→( . . . ) and its reciprocal form ( . . . )-[:]←(:A)←[:Y]-( . . . )
   b. TWO_GRAM_INCOMING_INCOMING_COUNT (X, A, Y)
      Stores the count of the pattern ( . . . )-[:X]→(:A)←[:Y]-( . . . )
   c. TWO_GRAM_OUTGOING_OUTGOING_COUNT (X, A, Y)
      Stores the count of the pattern ( . . . )←[:X]-(:A)-[:Y]→( . . . )

In a, b, and c above, x and Y are identifiers (IDs) of relationship types (e.g. KNOWS, WORKS_AT), while A represents the ID of a node label in the graph (e.g. Person, Company). For example, in (a) above a matching bi-gram would be a Person node that has an incoming KNOWS relationship (e.g. from another Person node) and an outgoing WORKS_AT relationship (e.g. to a Company node) as illustrated by the example shown in FIGS. 4A-4C.

In the example shown in FIG. 4C, a partial graph is shown where person Bob knows person Alice, and where person Alice works at Acme. The bi-gram which matches that graph pattern is shown in FIG. 4B.

Clearly there are many possible combinations of bi-grams in a database even with a modest number of node labels and relationship types. In various embodiments, bi-gram counts are stored at low cost since in practice many of the possible bi-gram counts occur zero times and are therefore not stored.

Figure 5:
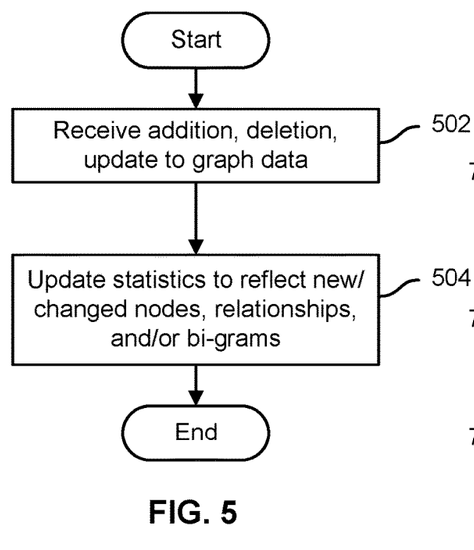
FIG. 5 is a flow diagram illustrating an embodiment of a process to store and maintain graph database statistics, including bi-gram counts.

FIG. 5 is a flow diagram illustrating an embodiment of a process to store and maintain graph database statistics, including bi-gram counts. In various embodiments, the process of FIG. 5 may be implemented in software executed by a processor, such as a processor comprising a graph database management system. In the example shown, additions, deletions, and/or updates to graph data are received at 502. Graph statistics, such as statistics 218 of FIG. 2, are updated to reflect the new/changed/deleted nodes, relationships, and/or bi-grams.

On an operational level, in various embodiments, the bi-gram counts store is created/maintained in two scenarios:
 a. During a bulk import to the database (e.g. when initializing the database from other data sources); and
 b. during transactional updates to the database (e.g. during normal database operations).

Figure 6:
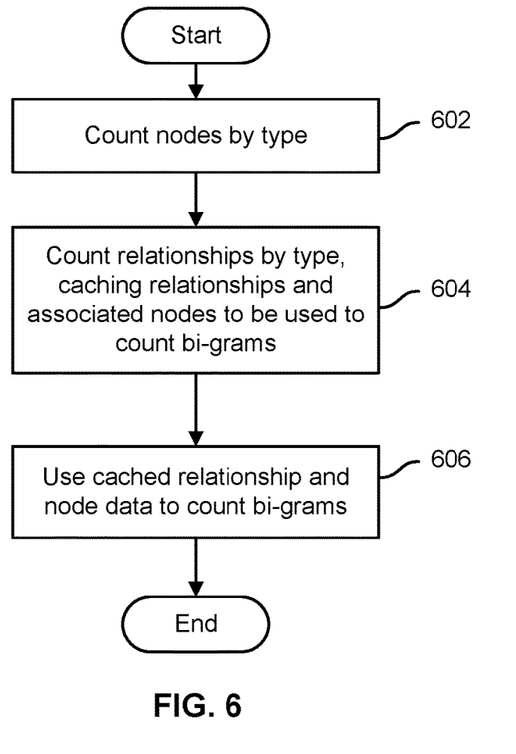
FIG. 6 is a flow diagram illustrating an embodiment of a process to store graph statistics in connection with bulk import of data.

FIG. 6 is a flow diagram illustrating an embodiment of a process to store graph statistics in connection with bulk import of data. In various embodiments, for bulk imports, a processing stage is included along with the "node" and "relationship" counts implemented in prior approaches. The stages in the counts store as implemented in various embodiments are as follows:
 a. Node Counts Stage. At 602, label counts on nodes are constructed such that the counts store contains an exact value of how many times every node label appears in the graph.
 b. Relationships Counts Stage. At 604, counts are constructed for relationship types appearing with nodes such as (:A)-[:X]→( . . . ) and (:B)←[:X]-( . . . ). In various embodiments, a cache is constructed at 604 that temporarily holds relationships and nodes, to be subsequently used in the bi-gram counts stage described below.
 c. Bi-Gram Counts Stage. At 606, all the relationships in the graph are traversed again. For every relationship encountered, a cache lookup occurs into the cache created in (b) above (i.e., at 604) to identify its neighbors. From this lookup the types of the adjacent relationships and the label(s) of the common node are determined. This constitutes a bi-gram which is stored for later processing.

Figure 7:
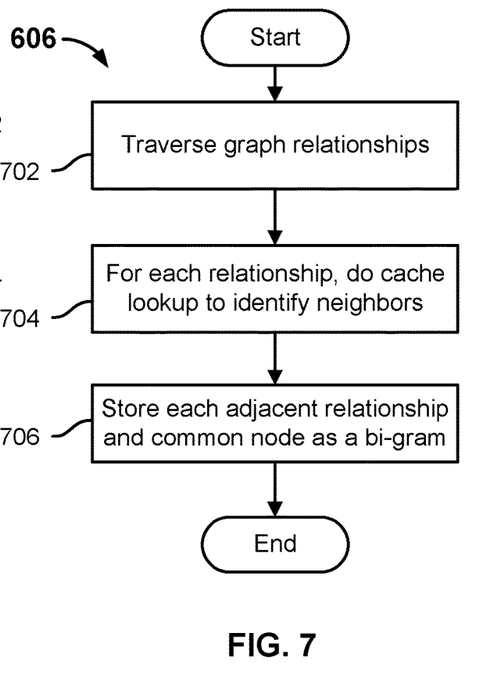
FIG. 7 is a flow diagram illustrating an embodiment of a process to use cached node and/or relationship data to count bi-grams.

FIG. 7 is a flow diagram illustrating an embodiment of a process to use cached node and/or relationship data to count bi-grams. In various embodiments, the process of FIG. 7 is performed to implement step 606 of the process of FIG. 6. In the example shown, graph relationships are traversed (again) at 702. For each relationship, a cache lookup is performed at 704 to identify its neighbors. At 706, each adjacent relationship and common node are stored as a bi-gram, e.g., by incrementing and/or initializing a count for that bi-gram/pattern.

In the transactional (interactive) use case, in various embodiments, the system updates the counts store alongside any changes to the topology of the graph. During a database transaction, when nodes and relationships are added, deleted, or changed the counts store metadata remains consistent with respect to those changes upon transaction commit or rollback. To achieve this, the system behaves as follows, in various embodiments:
 a. Changing a node label. When adding, removing, or changing a node label for an existing node, the counts for all bi-grams centered on that node must change. For each node, the bi-grams in the store are resolved by label and updated to match the new graph topology. The system does this at a well-understood maximum cost bounded by the square of the degree of the node with largest degree in the graph.
 b. Changing or deleting a relationship. When changing an existing relationship, the system updates the values for both the source and destination of that relationship. In various embodiments, the system achieves this as follows:
  i. For a relationship r from node a to node b;
  ii. Update all bi-grams centered on a which contain r,
  iii. Update all bi-grams centered on b which contain r. The system ensures that the cost of changing the bi-gram store in this case is bounded by the twice the largest degree in the graph (assuming a and b both have the largest degree) but is substantially cheaper in the general case where degree is average rather than maximal.
 c. Adding a relationship. There are two cases to be considered when adding a new relationship r1 which connects from node a to node b, which are:
  i. If node b is a new node, then all relationships incident on b must also be new. For each newly incident relationship, the system counts pairs only once. That is for a bi-gram containing node b and relationships r1 and r2 that the count is updated when r1 is first encountered and the bi-gram is not counted twice when r2 is subsequently encountered. The system achieves this by storing temporary state to record which equivalent bi-grams have already been processed;
  ii. If node b is an existing node, the system checks whether r1 is new (whether its creation is within the scope of the current transaction) then a new bi-gram is counted accordingly. If r1 is not new then the same checks as per (i) above are performed to ensure correctness.

When a new relationship [y:Y] is added, and its connected relationship [x:X] is also new the count for [x:X]→(b:B)→[y:Y] or [x:X]→(b:B)←[y:Y] it is only incremented when x has been created before y based on its strictly monotonic identifier in the database management system. In various embodiments, the number of values to be updated is bounded by twice the maximum node degree found in the database.

In various embodiments, the system takes into account edge-isomorphism when constructing bi-gram counts such that when saving the count of ( . . . )-[f1:FOLLOWS]→(:PERSON)←[f2:FOLLOWS]-( . . . ) that the count should only increase when f1≠f2.

The description to this point demonstrates that a system as disclosed herein correctly and accurately stores bi-gram counts during bulk loading and interactive operations. In various embodiments, a system as disclosed herein includes a cardinality estimator component which uses bi-gram counts to provide good estimates for cardinality to the query planner.

To aid understanding, recall that the cardinality of a path query q=(:A)-[:X]→(:B), in which the pattern matches nodes labelled A that have an outgoing X relationship to nodes labelled B, is represented as #(:A)-[:X]→(:B).

In various embodiments, a cardinality estimator of a system as disclosed herein implements an algorithm that reflects the following assumptions about the state of the graph topology.

a. Uniformity. Nodes with the same label have the same number of incoming/outgoing relationships of any given type. If #(:A)-[:X]→( ... )=2500 and #(:A)=500, it is assumed every node with label (:A) will have (on average) five outgoing relationships of type [:X]. In practice this is an approximation—in a social network, celebrity users may have many millions more followers than average users. In various embodiments, a system as disclosed herein works well enough because on average everyone is average.

b. Inclusion. In estimating #(:A)-[:X]→(:B) the query returns all relationships of type [:X] that have an start node with label (:A) and an end node with label (:B). The count is upper bounded by the counts of both #(:A)-[:X]→( ... ) and #( ... )-[:X]→(:B). For example if there are only 5 relationships of type [:X] from the counts store that have (:A) as a start node, there can never be more than five relationships that also have (:B) as an end node. In various embodiments, a system as disclosed herein uses the minimum of the two counts as a safe upper bound for estimation.

c. Independence. It is assumed that there are no correlations between any two types of relationships appearing together. That is, the estimate of #(:A)-[:X]→(B)-[:Y]→(:C) is not dependent on occurrences of #(:A)-[:X]→(:B) or #(:B)-[:Y]→(:C). However, in various embodiments, a system as disclosed herein is able to remove this independence assumption for patterns of length two.

In various embodiments, a system as disclosed herein builds on an equation whose solutions yield estimates for the cost of a query.

a. Let R and S be graphs;
b. Let Y be a set of relationships in both R and S;
c. Let R ⋈$_Y$ denote a join of the two graphs on shared relationships Y.
d. Let $T_R$ represent the cardinality of graph R and $T_S$ represent the cardinality of graph S;
e. Let V (R, Y) represent the number of unique relationships Y in R and V (S, Y) represent the number of unique relationships Y in S.

This leads to the cardinality equation for estimation shown in Equation 1:

Equation 1.

Cardinality estimation $$R \bowtie_Y S \approx \min\left\{T_R \cdot \frac{T_S}{V(S, Y)}, T_S \cdot \frac{T_R}{V(R, Y)}\right\}.$$

The formula shown in Equation 1 produces an estimate for the resulting cardinality of the graphs R and S joined on their common relationships. It also produces an estimate for the path query cardinality.

Techniques are disclosed to use bi-grams to (more accurately) estimate cardinality. In various embodiments, given a query pattern such as q=(:A)-[:X]→(:B)-[:Y]→(:C), Equation 1 is used to estimate the cardinality based on the join of R=(:A)-[:X]→(:B)-[:Y]-( ... ) and S=( ... )-[:X]→(:B)-[:Y]→(:C), with shared attributes Y=[:X]→(:B)-[:Y]. Using the inclusion assumption, $T_R$=V (R, Y) and $T_S$=V (S, Y), and after simplification, this yields the bi-gram cardinality estimator shown in Equation 2:

Equation 2.

Bi-Gram cardinality estimation $$\#(:A) - [:X] \to (:B) - [:Y] \to (:C) \approx \#[:X] \to$$

$$(:B) - [:Y] \cdot \min\left\{1, \frac{\#(:A) - [:X]}{\#[:X] - (:B)]}, \frac{\#[:Y] - (:C)]}{\#(:B) - [:Y]}\right\}.$$

The bi-gram cardinality estimator function shown in Equation 2, implemented in some embodiments as instructions in computer code, enables a graph database management system as disclosed herein to cheaply evaluate the cardinality of paths. In some embodiments, Equation 2 is interpreted and/or implemented as follows:

a. If [:X]→(:B)-[:Y] is the upper bound on the cardinality, such that the resulting query can never return more relationships than the number of existing [:X]→(:B)-[:Y] patterns in the graph.

b. $\dfrac{\#(:A) - (:X)}{\#[:X] - (:B)}$ is the ratio of out-degree of [:X] versus the in-degree of [:X], given that the if [:X]-(:B) connecting nodes have labels (:A) and (:B). The invention only considers cases where the in-degree of [:X] is larger than the out degree, as #(:A)-[:X]→(:B)-[:Y]→( ... ) is upper bounded by #( ... )-[:X]→(:B)-[:Y]→( ... ).

c. $\dfrac{\#[:Y] - (:C)}{\#(:B) - [:Y]}$ is similar to $$\dfrac{\#(:A) - [:X]}{\#[:X] - (:B)}.$$

There are cases where node (:B) may have several connected edges. This is known as a star pattern centered at node (:B). In the case where the degree of (:B) is three, in some embodiments, three bi-grams centered around (:B) are constructed, which each evaluates to a potentially different cardinality estimate. To provide a single estimate for such a star pattern, in various embodiments, the system conservatively chooses the largest of the cardinalities estimated.

It is also possible for bi-grams in a query to overlap, for example in the query q where q=(:A)-[:X]→(:B)-[:Y]→(:C)-[:Z]→(:D). In various embodiments, the system splits the n-gram into two bi-grams (:A)-[:X]→(:B)-[:Y]→(:C) and (:B)-[:Y]→(:C)-[:Z]→(:D) whose overlap is (:B)-[:Y]→(:C).

Using graph statistics from the metadata store, the system in various embodiments can compute good cardinality estimates for overlapping bi-grams. Since the database only returns only patterns which match the entire query pattern, the count of unique (:B)-[:Y]-(:C) in (:A)-[:X]→(:B)-[:Y]→(:C) is upper bounded by #[:X]-(:B)-[:Y] and #(:B)-[:Y]-(:C) is upper bounded by #[:Y]-(:C)-[:Z]. This results in the estimator function in Equation 3:

Equation 3.

Cardinality of overlapping bi-grams $$\begin{aligned}&\#(:A) - [:X] \to (:B) - [:Y] \to \\ &(:C) - [:Z] \to (:D) \approx \\ &\frac{(\#(:A) - [:X] \to (:B) - [:Y] \to (:C)) \cdot (\#(:B) - [:Y] \to (:C) - [:Z] \to (:D))}{\min\{\#[:X] - (:B) \to [:Y], \\ \#[:Y] - (:C), \\ \#[:Y] \to (:C) - [:Z], \\ \#(:B) - [:Y]\}}\end{aligned}$$

In various embodiments, a system as disclosed herein also collects statistics about bi-grams with unspecified node labels and relationship types. The same estimator function shown in Equation 2 is used in various embodiments to estimate cardinalities for this kind of query.

In various embodiments, a system as disclosed herein is able to compute the cardinality of variable-length paths. The system cheaply estimates #(:A)-[:X*(1 . . . n)]→(:B)-[:Y]→(:C) and #(:A)-[:X]→(:B)-[:Y*(1 . . . m)]→(:C), taking the maximum of either. In various embodiments, other and/or more accurate approaches may be used, but their runtime cost may multiply rapidly and therefore be prohibitive.

In some embodiments, statistics (e.g., counts) of n-grams other than bi-grams may be maintained and used to estimate cardinality for use in query planning. Albeit more costly to maintain, better cardinality estimations can be obtained when using higher-degree n-gram statistics.

In various embodiments, techniques disclosed herein are implemented as computer code as part of the Neo4j™ graph database management system. It is integrated into Neo4j™ by extending the previous pattern cardinality estimator, which did not compile or use bigram counts to estimate cardinality, with the result that in general the cardinality estimates produced are much improved.

The selectivity algorithm for cardinality estimation as implemented in some embodiments is illustrated by the following pseudocode:

Given a query graph q, in various embodiments, a cardinality estimator module, such as cardinality estimator 212 of FIG. 2, produces cardinality estimates for every part of the query graph individually and subsequently combines them, in some embodiments as per the pseudocode above. These parts are referred to as Pattern Relationships which are of the shape (:A)-[:X]→:B). In some embodiments the Cypher graph query language is used. As Cypher allows for variable length patterns, every pattern relationship is assigned one of two types:

a. simple—regular pattern relationships of the shape (:A)-[:X]→(:B).

b. var_length(min,max)—variable length patterns, of the shape (:A)-[:X (min . . . max)]→(:B).

The estimates of individual pattern relationships are then combined into a cardinality estimate for the entire query graph. It is processed in various embodiments as follows:

a. For each pattern relationship in the query graph, estimate the selectivity.

b. The selectivity of each pattern relationship is multiplied to obtain the selectivity of the whole query. Since the invention can compute an upper bound on the cardinality of the entire query, it estimates the cardinality of the entire query by multiplying the selectivity estimate with upper bound.

In various embodiments, the algorithm outlined in pseudocode above is adapted and implemented as computer code. In some embodiments, the bigram cardinality estimation function of Equation 2 is encoded in computer executable instructions.

In some embodiments, the bigram cardinality estimation function is encoded as a method in software with the signature estimateBiGramCardinality(p1, p2). The method returns a cardinality estimate for a bi-gram containing pattern relationships p1 and p2.

In various embodiments, the graph is considered as a collection of star patterns which each need to be individually estimated. The overlap between those star patterns is calculated, in various embodiments, as shown in the following pseudocode:

Selectivity Estimator Algorithm as Implemented in Various Embodiments

```
1:  procedure ESTIMATESELECTIVITY(p)       ▷ Estimated selectivity of pattern relationship p
2:      card(p) ← min {#(:A) − [:X] → (. . .), #(. . .) − [:X] → (:B)}       ▷ cardinality of p
3:      ub(p) ← #(:A) •#(:B)       ▷ upper bound of p
```

4:  $sel(p) \leftarrow \dfrac{\text{card}(p)}{\text{ub}(p)}$        ▷ selectivity of $p$

```
5:      return sel(p)
```

| Pseudocode to estimate cardinality for a star pattern at a given node. |
| --- |
| 1: procedure ESTIMATECARDINALITYSTARPATTERN(n) |
| 2:     P ← PatternRelationshipsConnected To(n)     ▷ get connected pattern relationships |
| 3:     C ← GenerateAllPairCombinations(P)     ▷ all pairs of connected pattern relationships |
| 4:     for all $(p_1, p_2) \in C$ do |
| 5:         $card_{max}$ ← max($card_{max}$, estimateBiGramCardinality (p1, p2)) |
| 6:     return $card_{max}$     ▷ the cardinality of the pair with the highest cardinality |

If a star pattern has neighbors to its left and right, it is an overlap. In various embodiments, the overlap is calculated as shown:

| Pseudocode to estimate overlap between any two star patterns in the graph. |
| --- |
| 1: procedure ESTIMATEOVERLAP(p)     ▷ Given pattern relationship p, check for overlap |
| 2:     L ← PatternRelationshipsConnectedTo(p.left) |
| 3:     R ← PatternRelationshipsConnectedTo(p.right) |
| 4:     if size(L) > 1 and size(R) > 1 then     ▷ If p contained in two bigrams, it is an overlap |
| 5:         return estimateCardinalityForPattern(p) |
| 6:     else |
| 7:         return Ø |

In various embodiments, the sub-algorithms described above are combined into the following algorithm, expressed in pseudocode:

| Bi-gram cardinality estimation pattern cardinality estimates |
| --- |
| 1: procedure ESTIMATECARDINALITY(q)   ▷ The expected cardinality of query graph q |
| 2:     cards ← Ø     ▷ Store the cardinalities of all bi-grams |
| 3:     $sel_{product}$ ← Ø     ▷ Construct the product of selectivities |
| 4:     nodesVisited ← Ø     ▷ Remember the nodes that were visited |
| 5:     for all p ∈ q do     ▷ All pattern relationships in q |
| 6:         if p.left ∉ nodesVisited then |
| 7:             $c_{left}$ ← EstimateCardinalityStarPattern (p.left) |
| 8:             $sel_{product} \leftarrow sel_{product} \cdot \frac{1}{\#(p.\text{left})}$ |
| 9:             nodesVisited ← p.left |
| 10:       if p.right ∉ nodesVisited then |
| 11:          $c_{right}$ ← EstimateCardinalityStarPattern (p.right) |
| 12:          $sel_{product} \leftarrow sel_{product} \cdot \frac{1}{\#(p.\text{right})}$ |
| 13:          nodesVisited ← p.right |
| 14:          $c_{overlap}$ ← EstimateOverlap(p) |
| 15:          cards ← ($c_{left} \cdot c_{right} \cdot c_{overlap}$) |
| 16:     return $\#(n)^{|n|} \cdot$ product(cards) $\cdot sel_{product}$ ▷ Combine cardinalities & selectivity for q |

The above pseudocode is a simplified summary of cardinality estimation as it is implemented in various embodiments. In some embodiments, pattern relationships that are not part of any bi-grams, and other edge-cases are considered as well. For these disconnected pattern relationships, in various embodiments the estimation method of Equation 1 is used.

In various embodiments, the above algorithm is implemented as working computer code in the Scala language.

In various embodiments, techniques disclosed herein use structural metadata to process queries on graph data more quickly and efficiently than prior methods. For example, in various embodiments, one or more of the following may be provided and/or achieved:

1. The disclosed techniques provide an effective cardinality estimation technique for Cypher queries on correlated data.
2. The statistics used to perform bi-gram based cardinality estimation as disclosed herein are simple to maintain for evolving graphs, as well as inexpensive to store alongside the metadata already stored in the pre-existing graph database management system.
3. For a wide range of workloads, the approach disclosed herein is memory-efficient in the number of counts it stores in order to perform estimations. The burden on the underlying computer server is reduced, allowing more resources to be directed to processing work on behalf of users.
4. Using node and edges labels, bi-gram patterns are able to be estimated more accurately than techniques designed solely for edge-labeled graphs.
5. Estimation accuracy may be increased significantly compared to simple statistic-based cardinality estimation, typically decreasing the degree of error propagation by orders of magnitudes.

6. The approach disclosed herein better copes with longer path queries with multiple joins, which results in better plans to be selected by the query planner, reducing query execution time compared to prior approaches.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A graph database system, comprising:
   a communication interface; and
   a processor coupled to the communication interface and configured to:
   receive via the communication interface data associated with a query associated with a graph database;
   compute an expression cardinality associated with the query based at least on an expression associated with the query;
   compute a pattern cardinality of a pattern associated with the query,
   determine a combined cardinality based at least on the expression cardinality and the pattern cardinality, wherein at least one of the expression cardinality and the pattern cardinality is based at least on statistics associated with the occurrence in the graph database of one or more n-grams; and
   determine a plan to execute the query based at least in part on the combined cardinality.

2. The system of claim 1, wherein at least one of the one or more n-grams includes a bi-gram and n=2.

3. The system of claim 1, wherein:
   at least one n-gram of the one or more n-grams includes a sequence of n relationships occurring in a specific order; and
   at least one of the relationships is of a specific relationship type.

4. The system of claim 3, wherein each of the relationships is of a corresponding specific relationship type.

5. The system of claim 1, wherein at least one n-gram of the one or more n-grams comprises a bi-gram comprising a node common to two relationships.

6. The system of claim 5, wherein the node common to the two relationships is associated with a specific node type.

7. The system of claim 5, wherein the node common to the two relationships is associated with a specific node label.

8. The system of claim 5, wherein each bi-gram includes for each of the two relationships, in addition to the node common to the two relationships, a corresponding node not common to the two relationships.

9. The system of claim 8, wherein each of said corresponding nodes not common to the two relationships is associated with a corresponding node type.

10. The system of claim 1, wherein the processor is further configured to compute and store the statistics associated with the occurrence in the graph database of one or more n-grams.

11. The system of claim 10, wherein the processor computes and stores the statistics associated with the occurrence in the graph database of one or more n-grams in connection with bulk ingestion of data comprising the graph database.

12. The system of claim 10, wherein each n-gram comprises a bi-gram and the processor computes and stores the statistics associated with the occurrence in the graph database of one or more bi-grams in connection with bulk ingestion of data comprising the graph database at least in part by:
   maintaining a count of nodes by type;
   maintaining a count of relationships by type;
   caching relationships and associated nodes in connection with one or both of maintaining said count of nodes by type and maintaining said count of relationships by type; and
   using the cached relationships and associated nodes data to count bi-grams.

13. The system of claim 12 wherein the processor uses the cached relationships and associated nodes data to count bi-grams at least in part by traversing graph relationships; for each relationship, doing a cache lookup to identify neighbors; and storing each adjacent relationship and common node as a bi-gram.

14. The system of claim 10, wherein the processor computes and stores the statistics associated with the occurrence in the graph database of one or more n-grams in connection with runtime updates to data comprising the graph database.

15. The system of claim 14, wherein the processor is configured to update one or more n-gram counts in response to one of more of the following events: changing a node label or type; changing or deleting a relationship; and adding a relationship.

16. The system of claim 1, further comprising a memory or other data storage device coupled to the processor and configured to store the statistics associated with the occurrence in the graph database of one or more n-grams.

17. The system of claim 1, wherein the processor is further configured to compute the estimated cardinality associated with the query.

18. The system of claim 1, wherein at least one n-gram of the one or more n-grams comprises a bi-gram and the processor is configured to compute the pattern cardinality including by estimating the cardinality of star patterns associated with a bi-gram containing pattern relationships associated with the query.

19. The system of claim 18, wherein the processor is further configured to calculate the overlap between star patterns associated with said bi-gram containing pattern relationships associated with the query.

20. The system of claim 19, wherein the processor is configured combine the estimated is cardinality of star patterns associated with the bi-gram containing pattern relationships associated with the query with the calculated overlap to determine said pattern cardinality associated with the query.

21. A method, comprising:
   receiving via the communication interface data associated with a query associated with a graph database;
   computing an expression cardinality associated with the query based at least on an expression associated with the query;
   computing a pattern cardinality of a pattern associated with the query,
   determining a combined cardinality based at least on the expression cardinality and the pattern cardinality, wherein at least one of the expression cardinality and the pattern cardinality is based at least on statistics associated with the occurrence in the graph database of one or more n-grams; and
   determining a plan to execute the query based at least in part on the combined cardinality.

22. A computer program embodied in a non-transitory computer readable medium, comprising computer instructions for:
- receiving via the communication interface data associated with a query associated with a graph database;
- computing an expression cardinality associated with the query based at least on an expression associated with the query;
- computing a pattern cardinality of a pattern associated with the query,
- determining a combined cardinality based at least on the expression cardinality and the pattern cardinality, wherein at least one of the expression cardinality and the pattern cardinality is based at least on statistics associated with the occurrence in the graph database of one or more n-grams; and
- determining a plan to execute the query based at least in part on the combined cardinality.

* * * * *